Dec. 20, 1960 H. GÄRTNER 2,965,814
METHOD OF AND CIRCUIT ARRANGEMENT FOR TIMING
PHOTOGRAPHIC AND OTHER PROCESSES
Filed May 21, 1957 3 Sheets-Sheet 1

INVENTOR:
HERBERT GÄRTNER
BY Karl F. Ross
AGENT

INVENTOR:
HERBERT GÄRTNER
BY Karl F. Ross
AGENT

United States Patent Office 2,965,814
Patented Dec. 20, 1960

2,965,814

METHOD OF AND CIRCUIT ARRANGEMENT FOR TIMING PHOTOGRAPHIC AND OTHER PROCESSES

Herbert Gärtner, Hamburg, Germany, assignor to Lumoprint Zindler K.G., Hamburg, Germany, a company of Germany Filed May 21, 1957, Ser. No. 660,693

8 Claims. (Cl. 317—142)

The present invention relates to a circuit arrangement adapted to operate a load, e.g. the shutter of a photographic camera used in the taking of microfilms, for an accurately determined period independent of the length of actuation of a starter button or some other control element, as well as to a method of timing photographic and similar processes.

The broad overall object of the invention is to provide improved and simplified means for electrically timing the operation of the load in a precise manner determined, according to a pre-established relationship, by some external condition which changes the magnitude of a variable impedance included in the timer circuit.

A more specific object of the invention is to provide a method of and means for accurately controlling the length of exposure of a photographic film, used for example in the microfilming of documents, in accordance with the brightness of the specimen to be photographed (or of some particular portion thereof) as measured by a photoelectric cell whose internal resistance represents the aforesaid variable impedance.

It is also a specific object of the invention to provide a photographic system for the reproduction of documents or the like, in which the specimens to be successively photographed are maintained at an invariable distance from a camera objective of fixed diaphragm aperture, having means for varying the operative period of the camera shutter in accordance with the brightness of the specimen and for preventing double exposure in response to a single actuation of a starting button or the like, irrespectively of the duration of such actuation.

According to a feature of this invention there is provided a self-locking switching relay which, when operated by an actuating element, closes a timing circuit for the tripping of an electronic switch adapted to de-activate the switching relay. The timing circuit, according to another feature of the invention, is of the resistance-capacitance type including, preferably in its resistive branch, a variable impedance which may be the internal resistance of a photoelectric cell. Advantageously, the electronic switch comprises a device, such as a thyratron tube, which when tripped will not return to its normal or quiescent condition until the flow of operating current through it has been interrupted, this current also passing through a restoring winding of the relay in series with its holding contacts which in turn are bridged by contacts of the control element; as a result of this arrangement, the operating current will not be cut off if the actuating element is maintained operative beyond the release of the switching relay, hence the relay will not be operated more than once during any actuation of that element. If an arrangement of this type is used to control the shutter of a photographic camera, double exposures will be positively prevented. Other means for preventing double exposure may likewise be provided, e.g. in the form of a feed mechanism so controlled from the switching relay as to advance the photographic film automatically upon every closure of the shutter. In order to render the system substantially insensitive to ambient conditions which tend to vary the ignition potential of a gas-filled tube such as a thyratron, the latter may be replaced or supplemented by a high-vacuum trigger stage such as a monostable multivibrator connected to have its operating condition controlled by the output voltage of the timing circuit; the multivibrator may comprise, for example, a pair of triodes sharing a common cathode resistor and having the control grid of one triode conductively connected to the plate of the other triode.

The invention will be described in greater detail with reference to the accompanying drawing in which.

Figure 1:
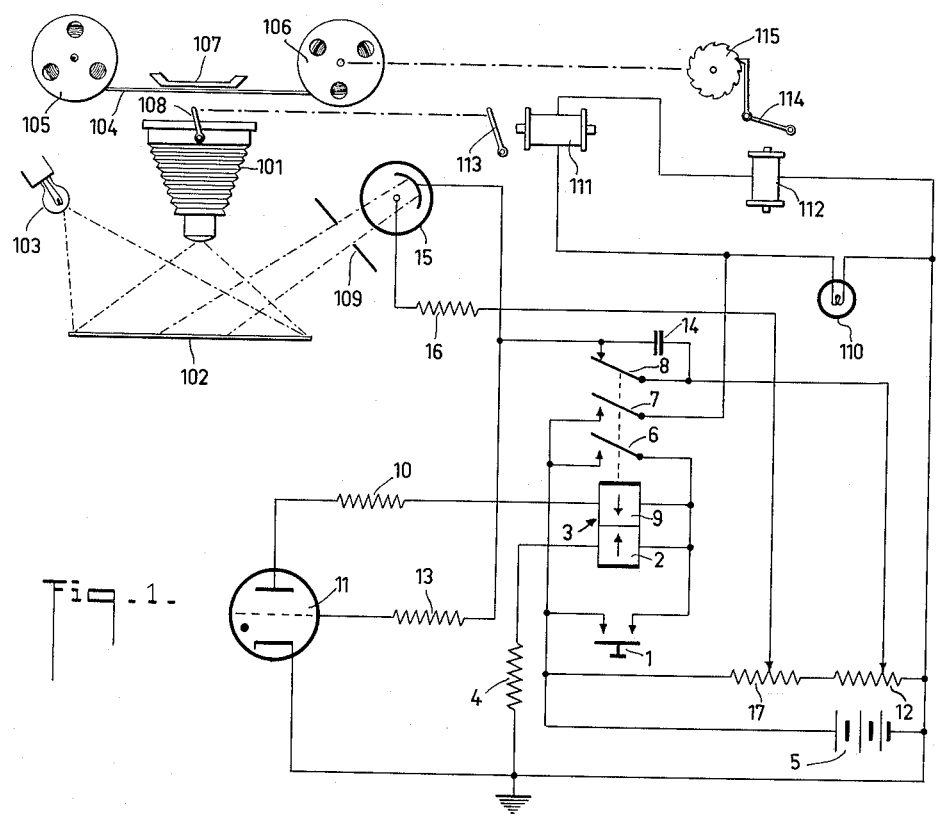
Fig. 1 is a diagrammatic view of a circuit arrangement according to the invention forming part of a system for the taking of microphotographic pictures.

In Fig. 1 there has been shown schematically a photographic camera 101 adapted to take microphotographs of a specimen 102 illuminated by a source of light here illustrated as a lamp 103. The image of the specimen 102 is projected by the camera 101 upon a film 104 which is unwound from a supply reel 105 and wound upon a take-up reel 106 after moving past a backing plate 107; the shutter-release lever of the camera has been indicated at 108.

The circuit arrangement for controlling the operation of the camera 101 comprises a manual actuating element in the form of a starting switch 1 which bridges the holding armature 6 and associated front contact of a differential relay 3 having windings 2 and 9. Relay 3 also has an armature 7, whose front contact is connected to the ungrounded positive terminal of a source of power shown schematically as a battery 5, and an armature 8 normally short-circuiting, via its back contact, a condenser 14; this back contact is connected to the cathode of a photocell 15 and, through a protective resistor 13, to the grid of a thyratron tube 11. Photocell 15 is arranged to be illuminated by light reflected from specimen 102, e.g. by a central portion thereof as determined by the position of a diaphragm 109. The anode of this photocell is returned through a protective resistor 16 to the slider of a potentiometer 17 connected, in series with a second potentiometer 12, across the voltage source 5; the slider of the latter potentiometer is connected to armature 8.

An energizing circuit for relay 3 extends from the positive terminal of battery 5 through starting switch 1, operating winding 2 and a series resistor 4 to ground and negative battery terminal; a second energizing circuit extends, in bucking relationship with the former, from positive battery over a front contact and armature 6 of relay 3 through its restoring winding 9, plate resistor 10 and the anode-cathode gap of thyratron 11 to ground. Armature 7, whose front contact is connected in parallel with that of armature 6 to positive battery, is adapted to close a circuit for an indicator lamp 110 and, in parallel therewith, for two serially connected electromagnets 111 and 112. Armature 113 of electromagnet 111 is linked with shutter-release lever 108 of camera 101; armature 114 of electromagnet 112 carries a pawl arranged to step a ratchet 115 upon the release of the magnet, this ratchet being coupled with take-up reel 106.

To operate the system of Fig. 1, the user closes starting switch 1 so as to operate the relay 3 by the passage of current through its winding 2. The relay, in attracting its armatures, locks independently of switch 1 by means of armature 6, opens the short circuit around condenser 14 at armature 8 and energizes the electromagnets 111 and 112 as well as lamp 110 at armature 7, thereby opening the shutter of camera 101 and preparing for the advance of film 104. Condenser 14 charges through resistor 16 and photocell 15 at a rate determined by the amount of light impinging upon it from specimen 102; after an exposure of suitable duration, condenser 14 has driven the grid of thyratron 11 sufficiently positive to ionize this tube so that current will now also flow through winding 9. This releases the relay 3 which in turn de-energizes the magnets 111 and 112 along with indicator lamp 110, thereby closing the camera shutter and advancing the film 104. If, by this time, the starting switch 1 has not been restored to open condition, both windings of relay 3 will continue to carry current and tube 11 will remain energized, no re-operation of the relay being possible under these circumstances. As soon as the switch is opened, or as soon as armature 6 disengages its front contact if this switch had been released before, the thyratron 11 is extinguished; with condenser 14 discharged at armature 8, another operating cycle may now begin upon renewed closure of switch 1.

The sensitivity of the arrangement of Fig. 1 may be adjusted by means of potentiometer 12 whose position determines the potential of the right-hand plate of condenser 14 and, thereby, the amount of charge that must be accumulated thereon in order to bring its left-hand plate to the breakdown potential of the thyratron; the rate of charge depends, for a given intensity of illumination, upon the position of potentiometer 17. Proper adjustment of these controls thus makes it possible to vary the length of exposure as a predetermined function of the reflected amount of light integrated over the open-shutter period of the camera.

Figure 2:
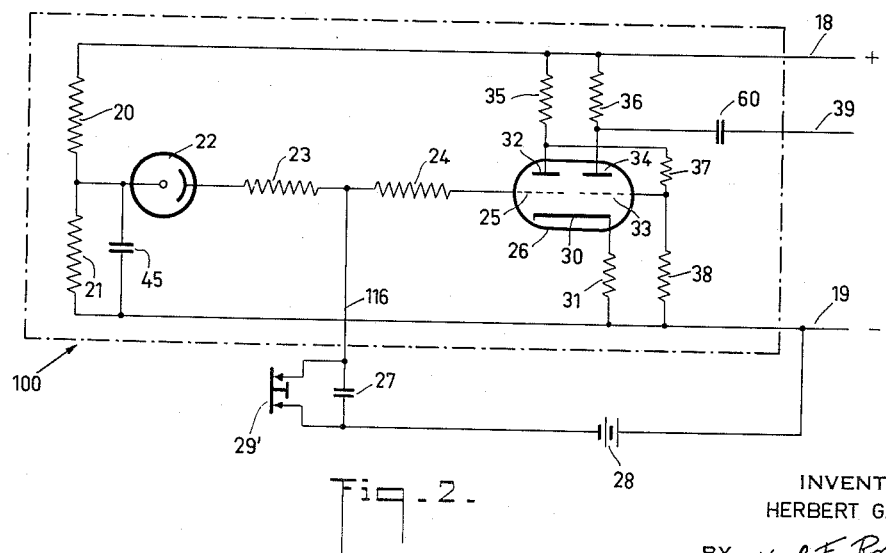
Fig. 2 is a circuit diagram of a trigger stage adapted to be used in a modification of the circuit arrangement of Fig. 1.

Fig. 2 shows a trigger stage 100 adapted to be connected to the input of a thyratron in place of the circuit elements 12—17 of Fig. 1. It comprises a voltage divider 20, 21 connected across a positive bus-bar 18 and a negative bus-bar 19 maintained at suitable potentials by an external voltage source not shown in this figure. The anode of a photocell 22, which may be utilized in a luminosity-measuring circuit similar to that shown in Fig. 1, is connected to the junction of the resistors 20 and 21, the latter being shunted by a smoothing condenser 45; the grid 25 of the left-hand section of a double triode 26 is connected via a voltage divider 23, 24 to the cathode of the photocell. The left-hand plate 32 and the right-hand plate 34 of tube 26 are connected to positive bus-bar 18 via resistors 35 and 36, respectively; the right-hand grid 33 of the tube is tied to the junction of two resistors 37, 38 serially connected between plate 32 and negative bus-bar 19. The latter bus-bar is connected through a resistor 31 to the common cathode 30 of both triode sections and is further connected to the positive terminal of a biasing battery 28 whose negative terminal is connected to a timing condenser 27 inserted between this battery and a conductor 116 leading to the junction of resistors 23 and 24; condenser 27 is bridged by a switch 29'. An output lead 39, which includes a blocking condenser 60, extends from the plate 32 of the left-hand triode section of tube 26 which in effect represents a monostable multivibrator.

In the closed position of switch 29' the grid 25 will be biased sufficiently negatively to cut off current in the left-hand triode section of multivibrator tube 26, the right-hand triode section being conductive. When the switch 29' is opened and the photocell 22 is illuminated so as to represent a finite resistance, condenser 27 is charged from positive bus-bar 18 until the grid 25 has been driven above cutoff, whereupon the plate terminal of resistor 35 goes more negative and lowers the potential of grid 33; this, in turn, lowers the potential of cathode 30 and increases the flow of current through plate 32, the action being cumulative until the right-hand tube section is cut off. A sharp positive pulse of predetermined amplitude is thus transmitted over lead 39 by way of condenser 60. When switch 29' is reclosed, condenser 27 is discharged and cuts off the left-hand triode section, the right-hand section becomes again conductive and the cycle may be repeated.

Figure 3:
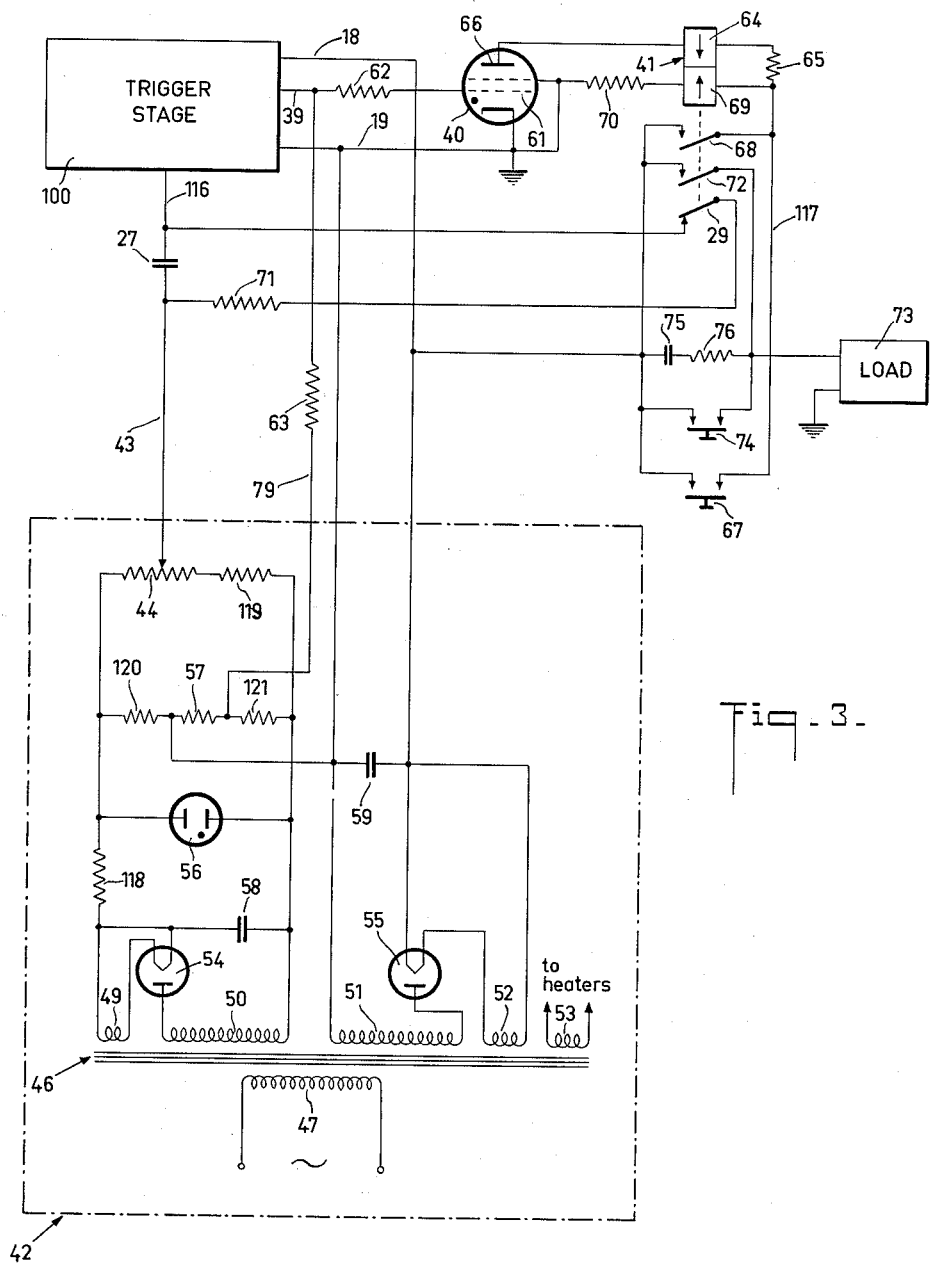
Fig. 3 is a circuit arrangement according to the invention embodying the trigger stage of Fig. 2.

In Fig. 3 the output lead 39 of trigger stage 100 has been shown connected, by way of a protective resistor 62, to the control grid 61 of a thyratron 40. Plate 66 of the thyratron is connected through the restoring winding 64 of a differential relay 41 and through a resistor 65 to a lead 117 tied to the holding armature 68 of the relay, this armature and its front contact being shunted by starting switch 67. The front contacts of armature 68 and of a second relay armature 72 are connected to positive potential on bus-bar 18, armature 72 being connected to a load 73 which may include a camera-connected mechanism of the type illustrated in Fig. 1. Armature 72 and its front contact are bridged by a switch 74 and by a spark-quenching circuit comprising a condenser 75 and a resistor 76 in series. A third relay armature 29, taking the place of switch 29' in Fig. 2, normally closes over its back contact a discharge circuit for condenser 27 via a resistor 71. From lead 117 an energizing circuit for relay 41 extends through the operating winding 69 and a resistor 70 to ground on bus-bar 19 which is also connected to the cathode of tube 40.

The bus-bars 18 and 19 are energized from a power supply 42 which comprises a transformer 46 having a primary winding 47 and secondary windings 49, 50, 51, 52, 53. Winding 49 heats the filament of a diode tube 54 which rectifies the output current of winding 50 connected across its electrodes in series with resistors 118, 119 and a potentiometer 44, the slider of the latter being connected to a lead 43 forming an extension of lead 116 beyond condenser 27. The combination of resistances 44, 119 is shunted by three series resistors 120, 57, 121 and also by a gas-filled diode 56 serving as a voltage stabilizer; a smoothing condenser 58 is bridged across the series combination of winding 50 and diode 54. Grounded bus-bar 19 is connected to the junction of resistors 120, 57 and also to one terminal of winding 51 whose other terminal is returned to high-voltage bus-bar 18 through the anode-cathode space of a rectifier diode 55, the series combination of tube 55 and winding 51 being shunted by a smoothing condenser 59. Heating current is supplied to the filament of tube 55 by winding 52. Winding 53 serves to heat the filaments of the external electron-discharge tubes such as the thyratron 40 and the multivibrator tube 26. The junction of resistors 57 and 121 is connected to output lead 39 via a conductor 79 and a series resistor 63.

In operation, closure of switch 67 operates the relay 41 which at armature 29 opens the short circuit around condenser 27, thereby initiating the sequence of operations described in connection with Fig. 2 which result in the appearance of a positive pulse on lead 39 after a period determined by the illumination of photocell 22. This pulse exceeds the breakdown potential of thyratron 40 and causes that tube to fire, thus releasing the relay 41 by the passage of plate current through its restoring winding 64 in a manner analogous to that described in connection with relay 3 of Fig. 1. The de-activation of relay 41 discharges the condenser 27 and restores the trigger stage to its normal condition, yet a new cycle of operations cannot be initiated until the thyratron 40 has become de-ionized by the re-opening of switch 67 if the latter had been held closed beyond the release of the relay. There occurs, consequently, but a single actuation of load 73 during every closure of switch 67, the duration of such actuation depending upon the amount of light impinging upon photocell 22 as well as upon the adjustment given to potentiometer 44. Switch 74 is provided to enable direct actuation of the load 73 independently of the timing circuit, e.g. for the purpose of making a test exposure.

Figure 4:
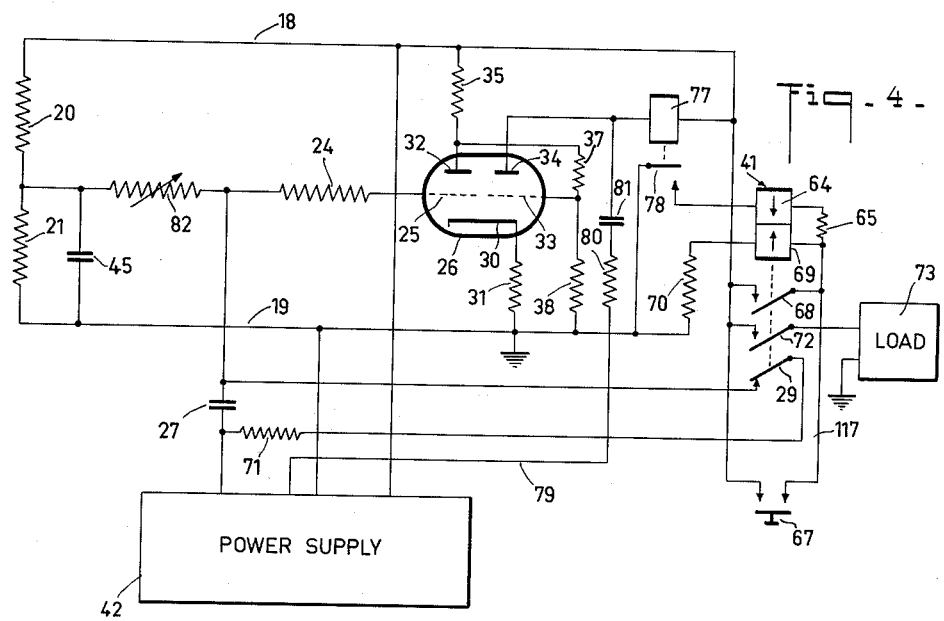
Figs. 4 and 5 are further, modified circuit arrangements embodying the invention.

In the embodiment of Fig. 4, where elements corresponding to those of Figs. 2 and 3 have been designated by the same reference numerals, an auxiliary electromagnetic relay 77 has been substituted for thyratron 40. The energizing circuit for this relay extends from positive bus-bar 18 through its winding to the right-hand plate 34 of multivibrator tube 26 which is further connected to lead 79 through a condenser 81 and a resistor 80 in series. Relay 77 has a single armature 78, grounded at bus-bar 19, whose back contact is connected through the restoring winding 64 of relay 41 and through dropping resistor 65 to the auxiliary high-voltage lead 117. The remaining connections are the same as in the two preceding figures, except that the controlling impedance of the timing circuit has been shown more generally as a variable resistance 82 in lieu of photocell 22.

As with the arrangement of Fig. 3, an operating cycle is initiated by the closure of starting switch 67 which operates the differential relay 41 in the manner previously described. It should be noted that auxiliary relay 77 is energized at this time by the current passing through the right-hand triode section of tube 26, hence the restoring circuit through winding 64 is open at armature 78. Timing condenser 27 begins to charge and measures an interval, determined by the adjustment of variable resistance 82, during which the operating circuit for load 73 is closed at armature 72. At the end of this interval the conductive condition of multivibrator tube 26 is reversed and the relay 77 releases, thereby de-activating the relay 41 which in turn breaks the load circuit and discharges the condenser 27. The cycle may then be repeated.

Figure 5:
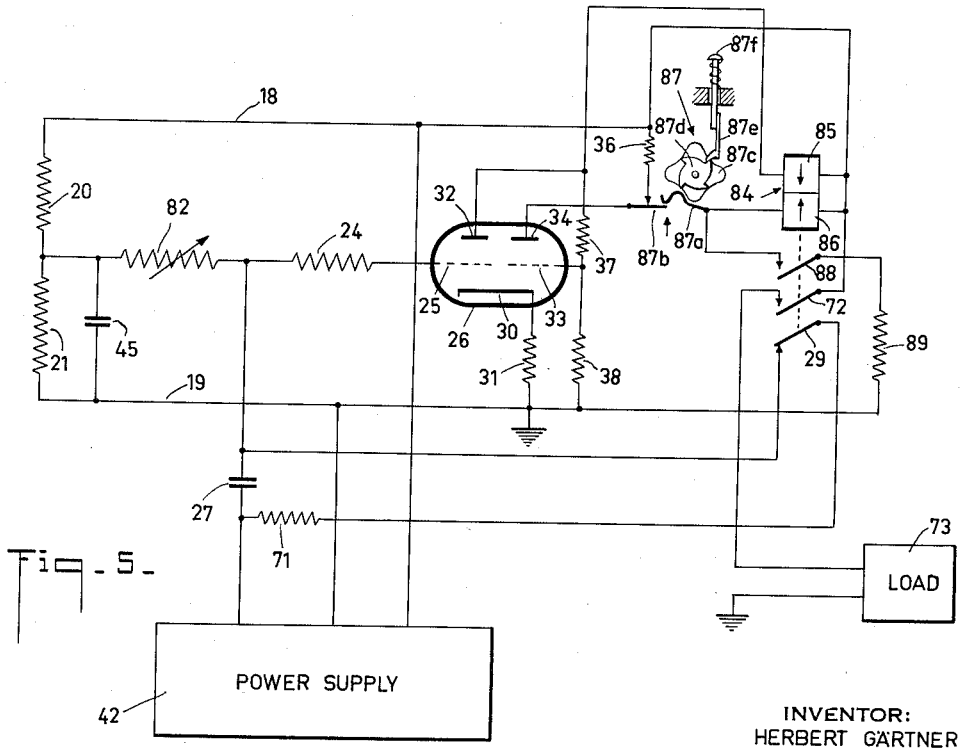

If the closure of starting switch 67 outlasts the timing interval measured by condenser 27, then a new cycle will be initiated immediately after the auxiliary relay 77 has reoperated upon the return of multivibrator tube 26 to its normal condition. In the event that the load 73 again comprises a camera shutter, double exposure may be prevented by suitable lockout means such as the mechanism shown in Fig. 1. It is also possible to use a starting switch which will close its contacts for only a brief period independent of the length of its actuation by the user, as has been illustrated in Fig. 5.

The arrangement of the latter figure is generally similar to that of Fig. 4 and the same reference numerals have been used to designate corresponding elements. The differential switching relay, here designated 84, has an operating winding 86 connected between positive bus-bar 18 and the contact arm 87a of a make-before-break switch, generally designated 87, whose armature 87b is connected to right-hand multivibrator plate 34; armature 87b normally engages a back contact connected through plate resistor 36 to bus-bar 18. Contact arm 87a is also connected to the front contact of relay armature 88 which is returned to ground on bus-bar 19 by way of a resistor 89. The restoring winding 85 of relay 84 is connected between bus-bar 18 and left-hand multivibrator plate 32. The relay 84 also has armatures 29 and 72 whose function is the same as in Figs. 3 and 4.

By way of illustration, switch 87 has been shown provided with a cam 87c adapted to depress the arm 87a into contact with armature 87b whereby the latter is disengaged from its back contact, cam 87c being rotatable by a ratchet 87d under the control of a resilient pawl 87e carried by a spring-loaded actuating button 87f. When the button is depressed against the force of its spring, cam 87c in rotating through a 90° angle momentarily closes the contacts 87a, 87b and disconnects plate 34 from resistor 36 immediately after connecting it to positive potential through relay winding 86, whereupon this relay operates and locks over its armature 88 independently of switch 87 and multivibrator 26. Condenser 27 begins to charge and ultimately renders the left-hand multivibrator section conductive so as to energize the restoring winding 85 of relay 84; this relay then releases and at its armature 29 discharges the condenser 27, thereby causing current to flow again through plate 34 which in the interim has been reconnected to resistor 36.

The invention is, of course, not limited to the specific embodiments described and illustrated but may be realized in various modifications, adaptations and combinations thereof, as well as for the purpose of bringing about a switching condition other than the closure of a load circuit, without departing from the spirit and scope of the appended claims.

What is claimed is:

1. A circuit arrangement comprising a differential electromagnetic relay having a first and a second winding, a source of electric energy, an operating and a de-activating circuit for said relay extending from said source through said first and said second winding, respectively, a control switch connected in said operating circuit for actuating said relay by energizing said first winding from said source, said relay having a first armature provided with a front contact and shunted across said switch for locking said relay operated independently of said switch, an electronic discharge device having an input circuit and an output circuit, variable-impedance means adapted to determine an adjustable switching interval, and condenser means serially connected with said variable-impedance means and said source in said input circuit for tripping said electronic discharge device into a different state of conductivity upon accumulating a predetermined charge, said output circuit including said source and being coupled with said de-activating circuit for energizing said second winding in said different state of conductivity, thereby releasing said relay, said relay further having a second armature provided with a back contact and shunted across said condenser means for discharging the latter upon the release of said relay, said relay upon attracting said second armature establishing said switching interval by initiating the charging of said condenser means from said source through said variable-impedance means.

2. A circuit arrangement according to claim 1 wherein said electronic discharge device comprises a monostable vacuum tube multivibrator.

3. A circuit arrangement according to claim 2, further comprising a triode having a plate-cathode circuit in series with said de-activating circuit and having a grid-cathode circuit in series with the output circuit of said multivibrator.

4. A circuit arrangement according to claim 2, further comprising a switching relay having a winding connected in the output circuit of said multivibrator and having contacts in series with said de-activating circuit.

5. A circuit arrangement comprising a differential electromagnetic relay having an operating winding and a deactivating winding, a source of electric energy, an electronic vacuum-tube trigger stage having an input circuit, a normally conductive first output circuit and a normally cut-off second output circuit, both of said output circuits including said source, a control switch having cam-operated contacts connected between said first output circuit, said operating winding and said source for momentarily including said operating winding in series with said source in said first output circuit, thereby actuating said relay, said de-activating winding being connected in said second output circuit in series with said source, variable-impedance means adapted to determine an adjustable switching interval, and condenser means serially connected with said variable-impedance means and said source in said input circuit for tripping said trigger stage, upon accumulating a predetermined charge, into an off-normal condition in which said second output circuit is conductive and said first output circuit is cut off, said relay having a first armature provided with a front contact and forming part of a locking circuit for said relay, said relay further having a second armature provided with a back contact and shunted across said condenser means for discharging the latter upon the release of said relay, said relay upon attracting said second armature establishing said switching interval by initiating the charging of said condenser means from said source through said variable-impedance means.

6. A circuit arrangement comprising a differential electromagnetic relay having an operating winding and a de-activating winding, a source of electric current, a monostable vacuum-tube multivibrator having an input circuit and an output circuit, said output circuit including said source and being normally in a first state of conductivity, variable-impedance means, condenser means serially connected with said variable-impedance means and said source in said input circuit for tripping said multivibrator, upon accumulating a predetermined charge, into an off-normal condition in which said output circuit is in a second state of conductivity, a control switch having normally open contacts adapted to close a circuit through said operating winding and said source for temporarily actuating said relay by energizing said operating winding, said relay having a holding armature provided with a make contact in shunt with said normally open contacts and another armature provided with a break contact in shunt with said condenser means, said relay upon attracting its armatures establishing an adjustable switching interval by initiating the charging of said condenser means from said source through said variable-impedance means, and circuit means so coupling said output circuit to said second winding as to energize the latter upon a change of said output circuit to said second state of conductivity, thereby releasing said relay and terminating said switching interval.

7. A circuit arrangement comprising a differential electromagnetic relay having an operating winding and a de-activating winding, a source of electric current, a control switch having normally open contacts, a thyratron tube having a grid and further having a plate-cathode circuit connected across said source in series with said de-activating winding and said normally open contacts, an input circuit for said thyratron tube connected to said grid, variable-impedance means, and condenser means connected in said input circuit in series with said variable-impedance means and said source for ionizing said thyratron tube upon the accumulation of a predetermined charge on said condenser means, said operating winding being connected in series with said source and said normally open contacts in a circuit independent of said thyratron tube, said relay having a holding armature provided with a make contact in shunt with said normally open contacts and another armature provided with a break contact in shunt with said condenser means, said relay upon attracting its armatures establishing an adjustable switching interval by initiating the charging of said condenser means from said source through said variable-impedance means.

8. A circuit arrangement comprising a differential electromagnetic relay having an operating winding and a de-activating winding, a source of electric current, a monostable vacuum-tube multivibrator having an input circuit and an output circuit, said output circuit including said source and being normally in a first state of conductivity, variable-impedance means, condenser means serially connected with said variable-impedance means and said source in said input circuit for tripping said multivibrator, upon accumulating a predetermined charge, into an off-normal condition in which said output circuit is in a second state of conductivity, a thyratron tube having a grid coupled to said output circuit for ionizing said thyratron tube upon a tripping of said multivibrator into said off-normal condition, and a control switch having normally open contacts, said thyratron tube having a plate-cathode circuit connected across said source in series with said de-activating winding and said normally open contacts, said operating winding being connected in series with said source and said normally open contacts in a circuit independent of said thyratron tube, said relay having a holding armature provided with a make contact in shunt with said normally open contacts and another armature provided with a break contact in shunt with said condenser means, said relay upon attracting its armature establishing an adjustable switching interval by initiating the charging of said condenser means from said source through said variable-impedance means.

References Cited in the file of this patent

UNITED STATES PATENTS

| 1,973,468 | Denis | Sept. 11, 1934 |
| 2,014,786 | Shepard | Sept. 17, 1935 |
| 2,251,306 | Thompson | Aug. 5, 1941 |
| 2,258,994 | Merriman et al. | Oct. 14, 1941 |
| 2,414,443 | Busch et al. | Jan. 21, 1947 |
| 2,463,985 | Linde | Mar. 8, 1949 |
| 2,582,676 | Bordewieck et al. | Jan. 15, 1952 |
| 2,654,858 | Feller | Oct. 6, 1953 |
| 2,668,474 | Rogers | Feb. 9, 1954 |
| 2,727,189 | Baston | Dec. 13, 1955 |
| 2,857,555 | Koen et al. | Oct. 21, 1958 |

FOREIGN PATENTS

| 741,939 | Great Britain | Dec. 14, 1955 |